J. H. ERMBTER.
DEVICE FOR DRIVING THE TEAZELING ROLLS OF CYLINDER TEAZELING MACHINES.
APPLICATION FILED MAY 22, 1915.

1,173,565.

Patented Feb. 29, 1916.
3 SHEETS—SHEET 2.

Inventor:
Jacob H. Ermbter
by his attorneys
Briesen & Knauth

J. H. ERMBTER.
DEVICE FOR DRIVING THE TEAZELING ROLLS OF CYLINDER TEAZELING MACHINES.
APPLICATION FILED MAY 22, 1915.
1,173,565.
Patented Feb. 29, 1916.
3 SHEETS—SHEET 3.
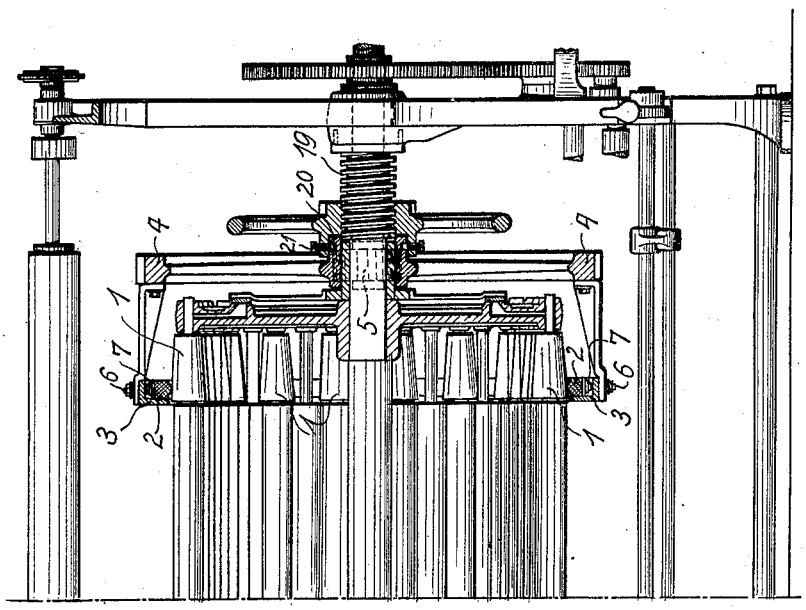
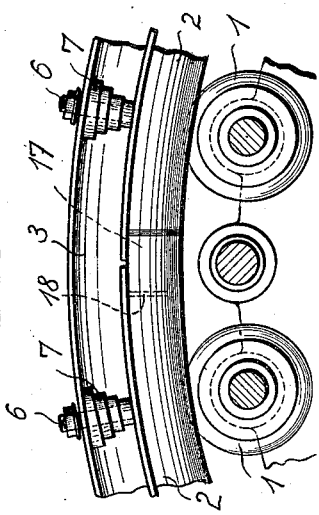
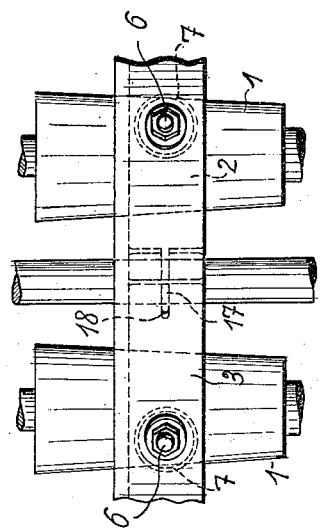

UNITED STATES PATENT OFFICE.

JACOB H. ERMBTER, OF NEUSS-ON-THE-RHINE, GERMANY, ASSIGNOR TO THE FIRM OF PAUL KLUG, SPECIAL MANUFACTURE OF FINISHING MACHINES, OF CRIMMITSCHAU, GERMANY.

DEVICE FOR DRIVING THE TEAZELING-ROLLS OF CYLINDER TEAZELING-MACHINES.

1,173,565.      Specification of Letters Patent.      Patented Feb. 29, 1916.

Application filed May 22, 1915. Serial No. 29,759.

*To all whom it may concern:*

Be it known that I, JACOB H. ERMBTER, a subject of the German Emperor, and a resident of 9 Fürtherstrasse, Neuss-on-the-Rhine, Germany, have invented certain new and useful Improvements in Devices for Driving the Teazeling-Rolls of Cylinder Teazeling-Machines, of which the following is a statement.

The known devices for driving the teazeling rolls of cylinder teazeling machines show the disadvantage, that the speed can be varied within comparatively narrow limits only, and mostly after a tedious work, and besides such driving devices are very complicated and subject to a rapid wear, not to mention the fact that they consume much power.

It is the object of the present invention to obviate the said disadvantages, and in particular to provide a more simple driving device and to allow of varying the speed within wider limits and in a more accurate manner by the simplest means.

Figure 1:
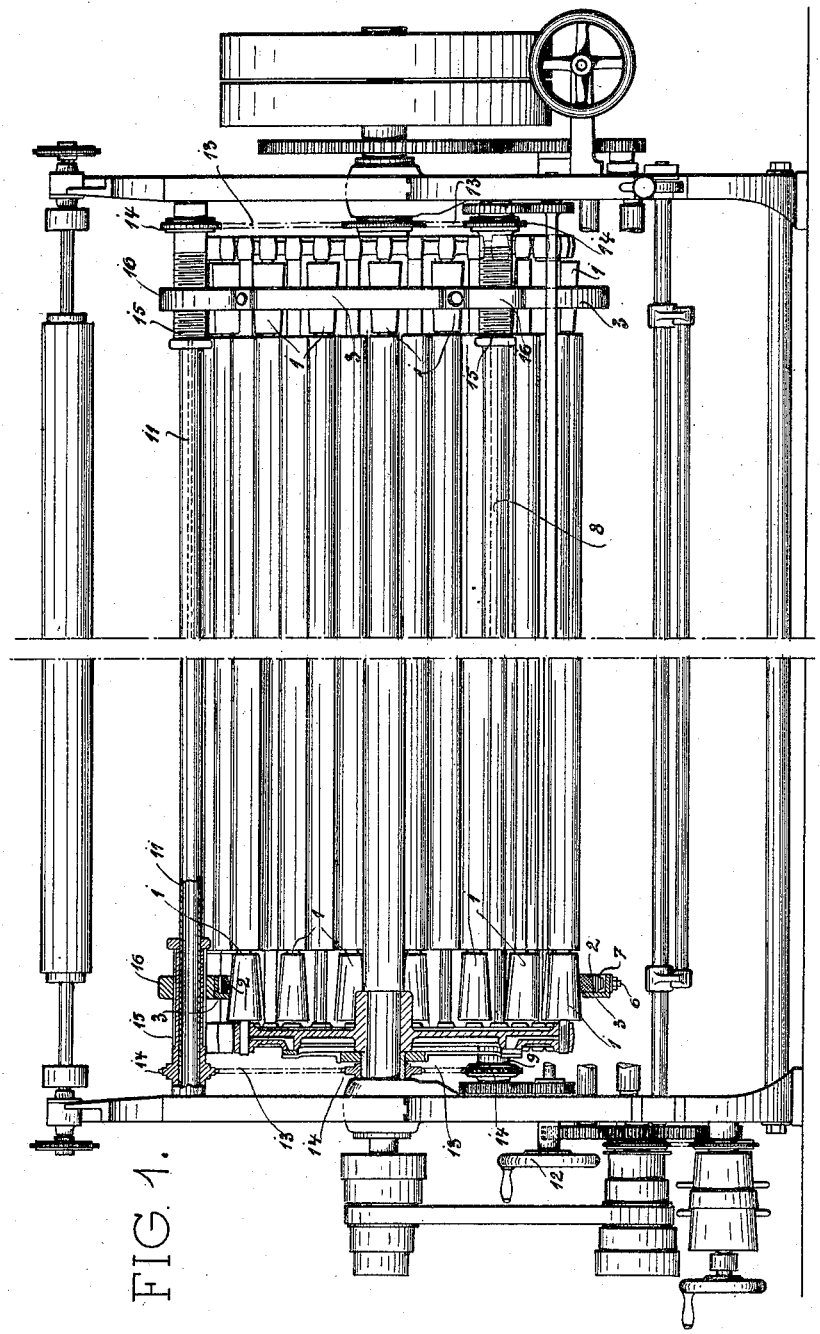
Figure 2:
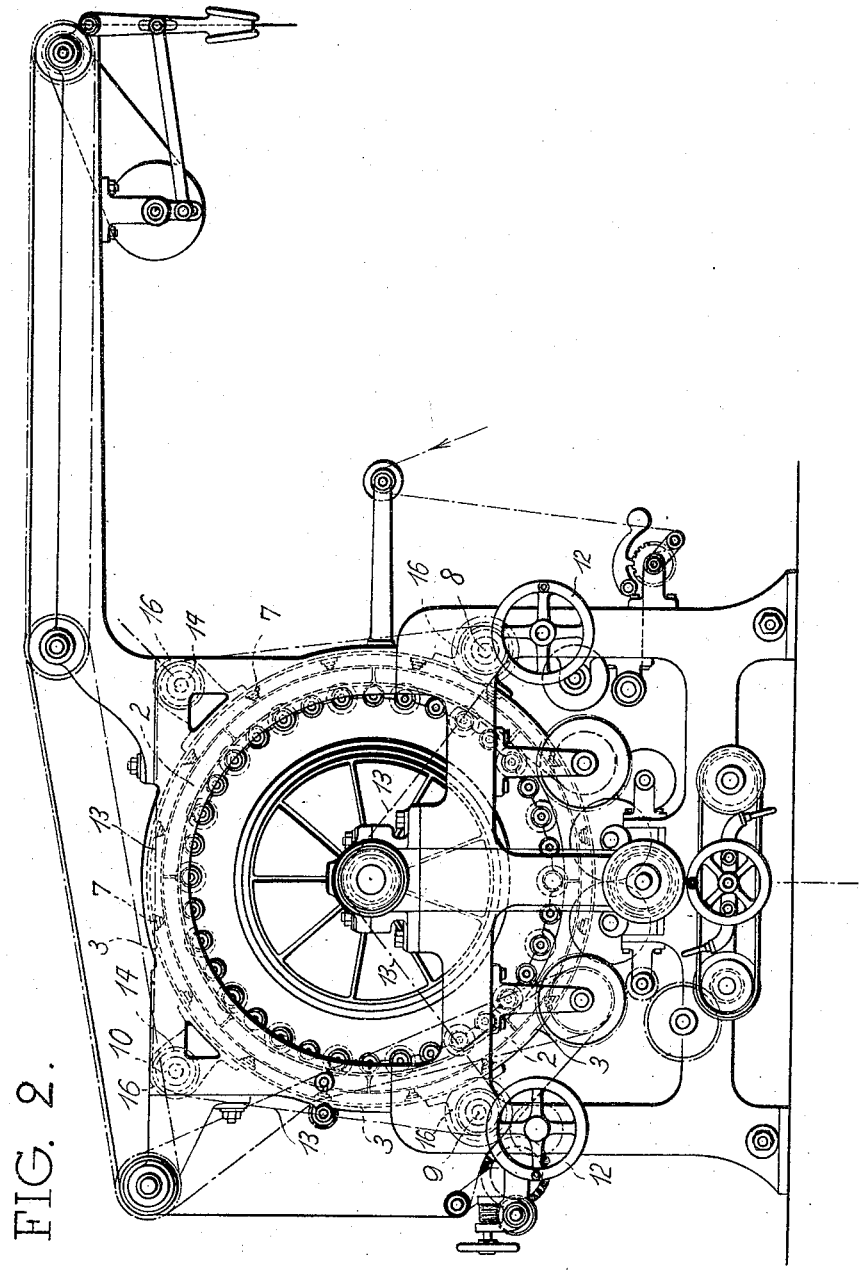

The invention has been exemplified in the accompanying drawing, Figure 1 being partly a section, partly a front elevation of a teazeling machine with the novel improvement, while Fig. 2 is an end view, and Figs. 3 and 4 illustrate details of the machine. Fig. 5 is a somewhat modified form of the driving device.

The essential feature of the present invention consists in that the teazeling rolls are fitted in place of the hitherto employed cylindrical driving pulleys, with conical driving pulleys 1, and that a ring-shaped friction member 2 is provided, inclosing the said pulleys in such a manner that they roll along the inner circumference of said friction member 2 while such friction member 2 is either at rest, Figs. 1 and 2, or is revolved by means of a special drive, Fig. 5.

The friction ring 2 is arranged in such a manner, that it can expand and can adjust itself to the various diameters of the conical pulleys 1 in an automatic manner. The said conical pulleys 1 or the ring 2, or both the former and latter are axially displaceable. The ring 2 is composed of a plurality of separate segments lined with leather or some other suitable material. These segments are disposed within a flange or annular member 3 and are guided thereon by means of radially disposed pins 6. In the construction shown in the drawing coiled springs 7 are fitted on these pins 6, the said springs 7 tending to force the segments toward the center of the ring and thus press them against the conical disks 1. When the ring 2 is to be revolved while the teazeling machine is working the flange encircling said sectional ring may be attached to a gear wheel, as shown in Fig. 5, or may be provided with teeth, said gear 4, or said teeth respectively meshing with a pinion 5, Fig. 5.

The flange 3, in the constructional form shown in Figs. 1 and 2, is axially displaceable on the cross bars 8, 9, 10 and 11 disposed at an even pitch. This axial displacement is effected by means of a handwheel; in the constructional form shown in Figs. 1 and 2 several such handwheels 12 are provided. By means of these handwheels an endless chain 13 is driven backward or forward, and the said chain engages on sprockets 14, which are thereby turned. These sprockets are secured to screwspindles 15, which are hollow and are fitted on the cross bars 8—11, and screw in sockets 16 having corresponding female threads and fitted to the flange 3. In consequence thereof, when the said handwheels, sprockets and screws are turned, the flange 3 and the ring 2 will be displaced. By such displacement the friction ring 2 will come into contact with a different part of the conical pulley 1, having a different diameter, and the result is, that the circumferential speed will be varied. The displacement is very easily effected in the manner described.

By the hereinbefore described arrangement it is possible to obtain with pulleys, which are but slightly tapered, a large range of speeds. As with the stationary friction ring the varying of the speed is effected merely by the displacement of the friction segments, this constructional form has the advantage that all intermediate gears which were hitherto required for driving the rolls and for varying the speed are dispensed with, so that the design of the teazeling machine is greatly simplified and its power consumption greatly reduced.

In the constructional form according to

Fig. 5 the boss of the handwheel is provided with a female thread and a sleeve 19 having a corresponding male thread is loosely fitted on the cylinder shaft, and secured in the side frame of the machine. The boss of the handwheel may therefore be screwed to and fro on the said stationary sleeve 19. The boss of the handwheel is coupled to the boss of the friction ring 2 by means of a groove 20 in the latter and a pin 21 in the former engaging in said groove, so that, when the handwheel is screwed back or forward, it will carry the ring with it, without preventing the rotation of said ring. The speed of the teazeling rolls may, however, also be varied by varying the speed of the cylinder, and the present improved driving device for the teazeling rolls also allows of such variation of the cylinder speed, what was hitherto not possible with the known teazeling machines.

In order to prevent the drive of the conical pulleys being interrupted between the individual segments, when the ring is expanded, the ends of the said segments 2, or the ends of the lining attached to them are provided with corresponding tongues and grooves 17 and 18 respectively (Figs. 3 and 4), so that the tongues of the segments will always remain in engagement with the grooves of the adjoining segment, and the segments will, at all expansions, form a continuous ring. Friction rings 2 of the described construction are provided at both ends of the cylinder, and the teazeling rolls with the grain and against the grain, which alternate in known manner, are also provided, in known manner, with driving pulleys,—which according to the present invention are of a conical shape 1, at both ends. The teazeling machine as such is already known. My invention does not refer to the machine as such, so that a detailed description of the same may be here dispensed with.

I claim:

1. A cylindrical teazeling machine comprising a plurality of teazeling rolls, a plurality of continuously tapered driving cones mounted thereon, and an expansible ring-shaped member surrounding the cones, one of said parts being axially slidable relatively to the other part.

2. A cylindrical teazeling machine comprising a plurality of teazeling rolls, a plurality of continuously tapered driving cones mounted thereon, an annular member encompassing the cones, and a plurality of expansible segments encompassed thereby, said member being axially slidable relatively to the cones.

3. A cylindrical teazeling machine comprising a plurality of teazeling rolls, a plurality of continuously tapered driving cones mounted thereon, an annular member encompassing the cones, pins extending radially inward from said member, a plurality of expansible segments carried by the pins, springs mounted on the pins and engaging said segments, the annular member being axially slidable relatively to the cones.

4. In cylinder teazeling machines a friction ring composed of a rigid ring-flange and a plurality of radially adjustable segments carried thereby, the said segments engaging with each other by tongues and grooves at their respective ends, said ring adapted to act on the driving pulleys of the teazeling rolls and, in coöperation with the rotation of the cylinder drive the said teazeling rolls at various speeds.

JACOB H. ERMBTER.

Witnesses:
J. HYNEN,
J. D. ZIESECKE.

Copies of this patent may be obtained for five cents each, by addressing the "Commissioner of Patents, Washington, D. C."